United States Patent
Kulkarni et al.

(10) Patent No.: US 12,020,081 B2
(45) Date of Patent: *Jun. 25, 2024

(54) METHOD TO IMPLEMENT MULTI-TENANT/SHARED REDIS CLUSTER USING ENVOY

(71) Applicant: SAP SE, Walldorf (DE)

(72) Inventors: Aniruddha Kulkarni, Bangalore (IN); Shivansh Rai, Bangalore (IN); Dhatri Bidarahalli, Bangalore (IN); Vineet Singh, Delhi (IN)

(73) Assignee: SAP SE, Walldorf (DE)

( * ) Notice: Subject to any disclaimer, the term of this patent is extended or adjusted under 35 U.S.C. 154(b) by 252 days.

This patent is subject to a terminal disclaimer.

(21) Appl. No.: 17/704,282

(22) Filed: Mar. 25, 2022

(65) Prior Publication Data
US 2022/0334884 A1  Oct. 20, 2022

Related U.S. Application Data

(63) Continuation-in-part of application No. 17/235,275, filed on Apr. 20, 2021, now Pat. No. 11,546,307.

(51) Int. Cl.
*G06F 9/50* (2006.01)
*G06F 12/123* (2016.01)
*G06F 16/11* (2019.01)

(52) U.S. Cl.
CPC .......... *G06F 9/5072* (2013.01); *G06F 12/123* (2013.01); *G06F 16/125* (2019.01)

(58) Field of Classification Search
CPC .... G06F 9/5072; G06F 12/123; G06F 16/125; G06F 16/21; G06F 16/22; G06F 21/53; G06F 21/6218; G06F 16/256
See application file for complete search history.

(56) References Cited

U.S. PATENT DOCUMENTS

2006/0277077 A1* 12/2006 Coleman ................ G06Q 40/08
  705/4
2019/0042322 A1  2/2019 Calhoun et al.
(Continued)

FOREIGN PATENT DOCUMENTS

WO  2018/204341 A1  11/2018

OTHER PUBLICATIONS

Communication: "Extended European Search Report", Mar. 17, 2022 (Mar. 17, 2022), European Patent Office, for European Application No. 21199711.9-1218, 9 pages.
(Continued)

*Primary Examiner* — El Hadji M Sall
(74) *Attorney, Agent, or Firm* — Buckley, Maschoff & Talwalkar LLC

(57) ABSTRACT

A system and method are disclosed associated with at least one physical data store instance adapted to contain electronic records; and a shared cluster platform, coupled to the data store, including: a computer processor, and a computer memory, coupled to the computer processor, storing instructions that, when executed by the computer processor cause the shared cluster platform to: receive an eviction policy for a first tenant for a data store; map a first container for the first tenant to a physical data store instance; generate a unique first key element for the first tenant, wherein the eviction policy for the first tenant is linked to the unique first key element; and transmit a first endpoint of the first container as a proxy for the selected physical data store instance Numerous other embodiments are provided.

20 Claims, 12 Drawing Sheets

(56) References Cited

U.S. PATENT DOCUMENTS

2019/0229897 A1* 7/2019 Verrall ............... H04L 9/0836
2019/0391855 A1* 12/2019 Bernat ............... G06F 9/5088
2021/0004332 A1* 1/2021 Geri ................ G06F 12/0815

OTHER PUBLICATIONS

Dragon119: "Data partitioning strategies—Best practices for cloud applicationsMicrosoft Docs", Aug. 11, 2020 (Aug. 11, 2020), XP055898665, Retrieved from the Internet: URL:https://web.archive.org/web/20200811105729/https://docs.microsoft.com/en-us/azur e/architecture/best-practices/data-partitioning-strategies [retrieved on Mar. 8, 2022], (pp. 1-22, 22 total pages).

Stevestein: "Multi-tenant Saas patterns—1-15 Azure SQL Database | Microsoft Docs", Mar. 3, 2021 (Mar. 3, 2021), XP055898804, Retrieved from the Internet: URL:https://web.archive.org/web/20210303094351/https://docs.microsoft.com/en-us/azure/azure-sql/database/saas-tenancy-app-design-patterns, [retrieved on Mar. 8, 2022], (pp. 1-13, 13 total pages).

\* cited by examiner

700

| TENANT IDENTIFIER | LOGICAL DATA STORE INSTANCE IDENTIFIER | CONTAINER ENDPOINT | KEY ELEMENT | AUTHORIZATION PASSWORD | PHYSICAL DATA STORE INSTANCE IDENTIFIER |
|---|---|---|---|---|---|
| A | A | 1 | ABC | TUV | REDIS 1 |
| B | B | 2 | DEF | WXY | REDIS 1 |
| C | C | 3 | GHI | MNO | REDIS 2 |

| TENANT IDENTIFIER | KEY ELEMENT | AUTHORIZATION PASSWORD | PHYSICAL DATA STORE INSTANCE IDENTIFIER |
|---|---|---|---|
| A | ABC | TUV | REDIS 1 |
| B | DEF | WXY | REDIS 1 |

*FIG. 8*

| TENANT IDENTIFIER | LOGICAL DATA STORE INSTANCE IDENTIFIER | CONTAINER ENDPOINT | KEY ELEMENT | AUTHORIZATION PASSWORD | PHYSICAL DATA STORE INSTANCE IDENTIFIER | EXPIRATION/ EVICTION POLICY |
|---|---|---|---|---|---|---|
| A | A | 1 | ABC | TUV | REDIS 1 | NUMBER OF KEYS |
| B | B | 2 | DEF | WXY | REDIS 1 | HYBRID |
| C | C | 3 | GHI | MNO | REDIS 2 | MEMORY CONSUMPTION |

*FIG. 13*

METHOD TO IMPLEMENT MULTI-TENANT/SHARED REDIS CLUSTER USING ENVOY

CROSS-REFERENCE TO RELATED APPLICATION

This is a Continuation-in-Part of co-pending prior U.S. patent application Ser. No. 17/235,275, filed Apr. 20, 2021, entitled "METHOD TO IMPLEMENT MULTI-TENANT/SHARED REDIS CLUSTER USING ENVOY", the contents of which are hereby incorporated herein by reference in its entirety for all purposes.

BACKGROUND

Remote Dictionary Server (Redis) is a fast, open-source (BSD licensed) in-memory key-value database, cache, message broker and queue. Redis is a data structure store that provides and supports data structures such as strings, hashes, lists, sets, sorted sets with range queries, bitmaps, hyperlogs, geospatial indexes, and streams. In short, Redis may simplify code writing for an enterprise by enabling an enterprise developer to write fewer lines of code to store, access, and use data in the enterprise's applications. For example, if the application has data stored in a hashmap, and the developer wants to store that data in a data store, the developer can simply use the Redis hash data structure to store the data. A Redis instance refers to a particular single installation of the Redis server with associated memory storage.

Although Redis is an open-source database, often enterprises ("Service Consumers") may prefer to use a managed version of Redis provided by Platform as a Service (PaaS) vendors ("PaaS vendors") such as AMAZON® Web Services ("AWS"), or MICROSOFT® Azure. The PaaS vendors manage the provisioning (configuration, deployment and management of IT system resources) patching and other operations of the Redis instances while providing the Service Consumers with ease of simply accessing the Redis instance via a convenient network endpoint. PaaS vendors may offer services that may not be suitable to the Service Consumer workloads.

It would therefore be desirable to provide the functionality of Redis in a manner that is more tailored to the Service Consumer workloads.

BRIEF DESCRIPTION OF THE DRAWINGS

FIG. 7 illustrates a database in accordance with some embodiments.

FIG. 8 illustrates a database in accordance with some embodiments.

FIG. 13 illustrates a database in accordance with some embodiments.

DETAILED DESCRIPTION

Figure 1:
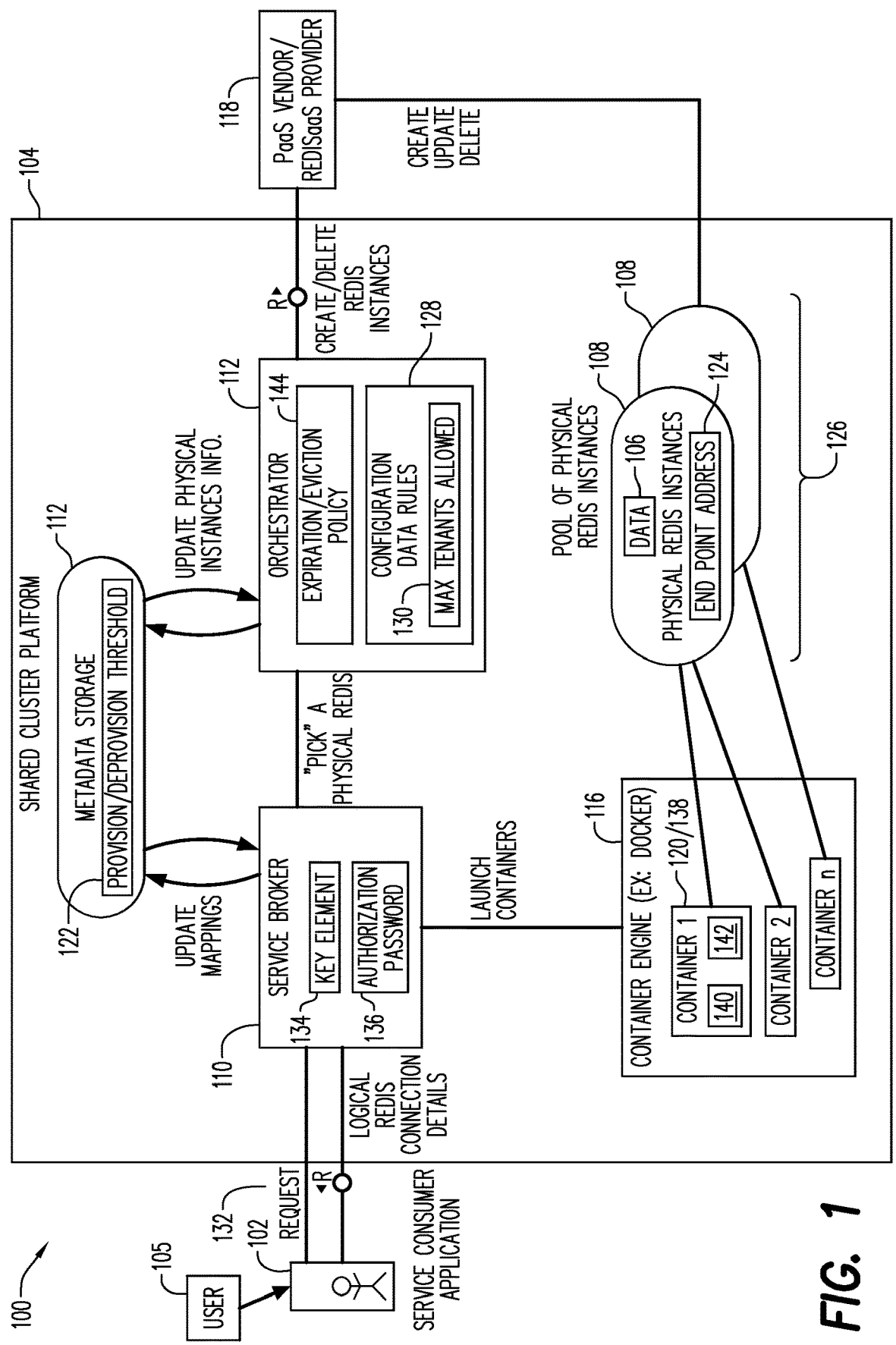
FIG. 1 is a high-level block diagram of a system in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail to not obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Enterprises may use one or more applications as part of their computing infrastructure, and may also use an external organization for their data persistency requirements. In particular the enterprise may use a PaaS, which in turn may use Redis for data persistency. At least one of these applications may have a requirement to store their customer's source application/data in an isolated fashion. To that end, an enterprise may request a Redis instance for each customer. For example, the enterprise may store Customer A's data on Redis instance ("instance") A and Customer B's data on instance B. A first problem with provisioning an instance of each customer is that it takes about 20 minutes to provision or de-provision an instance. If the frequency of customer provisioning/de-provisioning is high, this process may take a lot of time. As used herein, the output of a provisioning process is that the endpoint coordinates for the instance are delivered to the requestor in a matter of seconds, or other short amount of time. Once provisioned, all requests for data are read/write requests to the instance using the endpoint coordinates. As used herein, the terms "provisioning" and "onboarding" may be used interchangeably; and the terms "deprovisioning" and "offboarding" may be used interchangeably. It is however noted that the terms onboarding/offboarding are more often used in the context of a customer and provisioning/deprovisioning are more used in the context of a Redis instance (e.g., when Customer A onboards, we provision a logical Redis instance for that customer). A second problem with the provisioning of an instance for each customer is the cost of the actual instance. By dedicating one instance for each customer, as the customer base grows, the costs may spiral up.

Additionally, PaaS vendors typically offer various "tiers" or "plans" of a managed Redis service to Service Consumers with varying pricing according to the compute capabilities of the "tier" and other service level agreement factors, including but not limited to, high availability, disaster recovery (DR) capability, etc. The PaaS vendor may have a fixed set of these "tiers" predefined, which may or may not be suitable to the Service Consumer workload. As such, the Service Consumer may be forced to choose a service tier that is more than their application's needs. For example, consider a Redis instance of 6 GB of memory/storage. This may be too much for Customer A's storage needs, a good amount for Customer B, and not enough for Customer C. It may be a challenge for enterprises that they cannot select an optimal instance size, as this may translate into paying more money than optimal for any given application's workload.

Embodiments provide a shared cluster platform (e.g., shared Redis cluster platform) to address these problems. In embodiments, the shared cluster platform provides a shared/multitenant version of Redis instances by leveraging features supported by a protocol aware proxy, while continuing to use the Redis service offered by the PaaS vendor, behind the scenes. The shared cluster platform provides for multiple tenants to share a single large data store instance, while maintaining isolation of customer/tenant data, via a unique key element assigned to each tenant and attached to all data requests for that tenant, as described further below. Embodiments provide benefits to a Service Consumer's application including, but not limited to, optimum usage of the data store instance by using a single large, shared data store instance across multiple tenants and an opportunity to implement a cost optimal solution. Embodiments may also provide for a physical data store instance to be pre-created for the enterprise prior to a request from an application, such that provisioning of a logical data store instance may take a matter of seconds, rather than minutes, allowing for the provision of logical data store instances "on the fly". As used herein, the logical data store instance is a proxy instance for the physical data store instance in that the requesting application will contact the logical data store instance instead of the physical data store instance for data operations. Additionally, in scenarios that the physical data store instance is not pre-created, other than the initial procurement of the physical data store instance, the provisioning of the logical data store instance to each tenant thereafter may take seconds, as opposed to minutes.

FIG. 1 is a high-level block diagram of system architecture according to some embodiments. Embodiments are not limited to architecture 100.

Architecture 100 may include one or more service consumer applications 102 and a shared cluster platform 104.

The service consumer application 102 may send a request to a shared cluster platform 104. The service consumer applications 102 may comprise executable program code (e.g., compiled code, scripts, etc.) to receive queries from users 105 and provide results to the users 105 based on electronic record data 106 stored in a Redis instance 108 ("physical data store instance"). Architecture 100 also includes a Service Broker 110, Metadata Storage 112, an Orchestrator 114, a Container Engine 116, and a Redis provider 118.

One or more service consumer applications 102 may communicate with the shared cluster platform 104 using Redis client libraries including, but not limited to, IORedis, Jedis. These types of applications may use the Application Programming Interface (API) provided by these Redis client libraries to manage and query data stored in the physical data store instance 108.

The Redis provider 118 is a PaaS vendor and the entity responsible for providing Redis instances as a service. Non-exhaustive examples of a Redis provider 118 are AMAZON® Web Services ("AWS") and MICROSOFT® Azure.

The Service Broker 110 may be a software application that is responsible to accept requests on behalf of the service consumer application 102 to provision and deprovision data store instances. The Service Broker 110 may act as a "middleman" between the service consumer's application 102 and the Redis provider 118 which provides a physical data store instance 108. The instance provisioned by the Service Broker 110 to the service consumer application 102 may be referred to herein as a logical data store instance 120.

The Orchestrator 114 is a software application that is responsible to assess the currently provisioned physical data store instances 108 and determine if there is a need to provision more from the Redis provider 118. The Orchestrator 114 may also store data related to the current consumption/occupancy level for a physical data store instance 108 as well as a threshold level 122 set by the service consumer application. The Orchestrator 114 may use this stored data to select a physical data store instance 108 on which a logical data store instance 120 is to be created, as described further below. The Orchestrator 114 may request additional physical data store instance from the Redis provider 118 or may deprovision/return physical data store instances to the Redis provider 118 as needed, based on the one or more pre-set threshold levels 122.

The Metadata Storage 112 may be a logical storage accessible to the Orchestrator 114 and Service Broker 112. The Metadata Storage 112 may hold the data used to execute the processes described herein.

The Container Engine 116 may either be an on-premise or in-cloud container orchestration engine that generates software containers 138. A non-exhaustive example of a container engine is Docker®.

According to some embodiments, devices, including those associated with system architecture 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store information into and/or retrieve information from various data stores (e.g., the Metadata Storage 112), which may be locally stored or reside remote from the shared cluster platform 104. Although a single Shared Cluster Platform 104 is shown in FIG. 1, any number of such devices may be included. Moreover, various devices described herein might be combined according to embodiments of the present invention. For example, in some embodiments, the service consumer applications 102 and Service Broker 110 might comprise a single apparatus. Some or all of the system 100 functions may be performed by a constellation of networked apparatuses, such as in a distributed processing or cloud-based architecture.

A user 105 (e.g., a database administrator) may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to setup threshold values) and/or provide or receive automatically generated results from the system 100.

Figure 2:
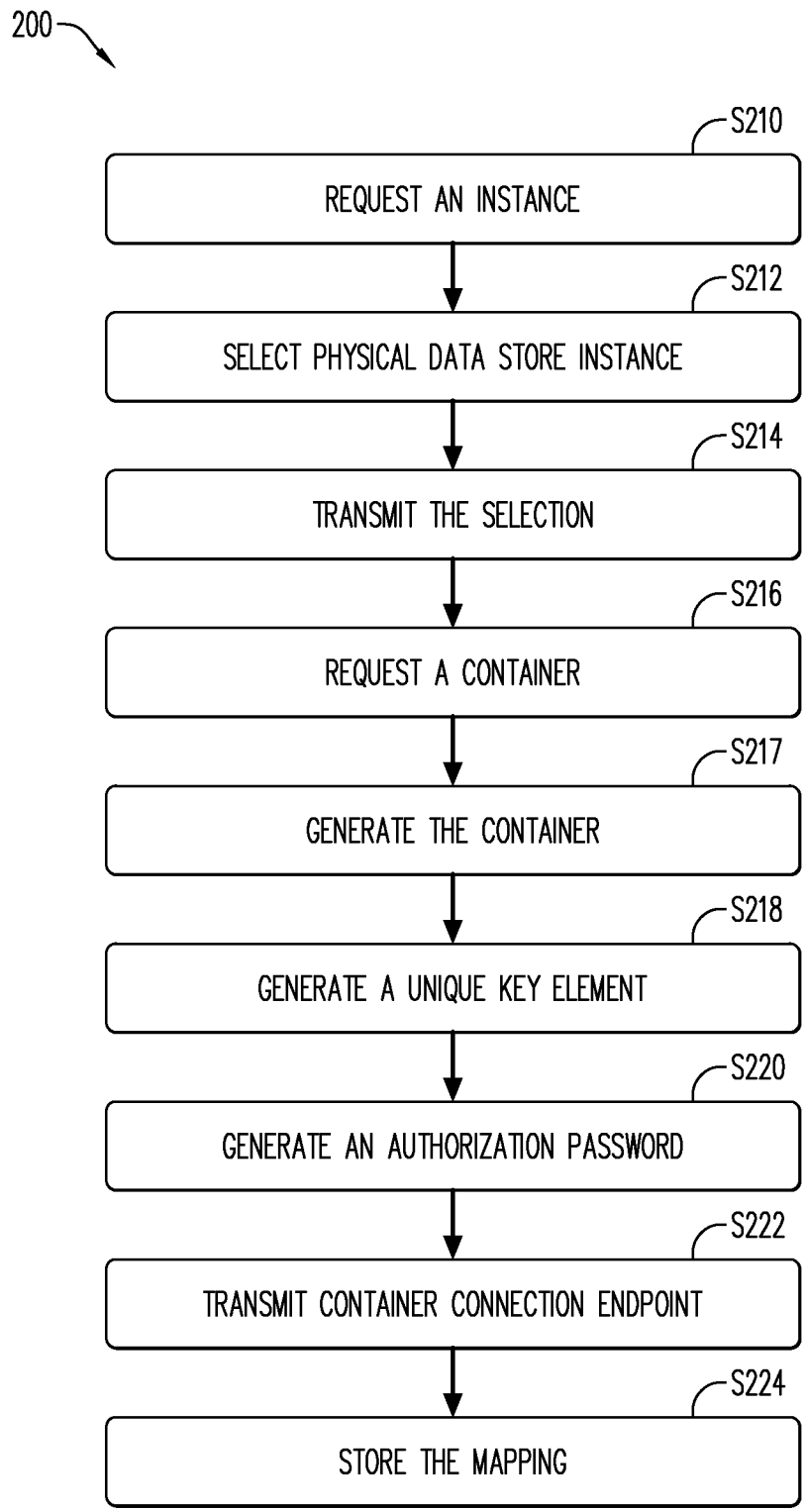
FIG. 2 illustrates a method to provision a physical data store instance according to some embodiments.
Figure 3:
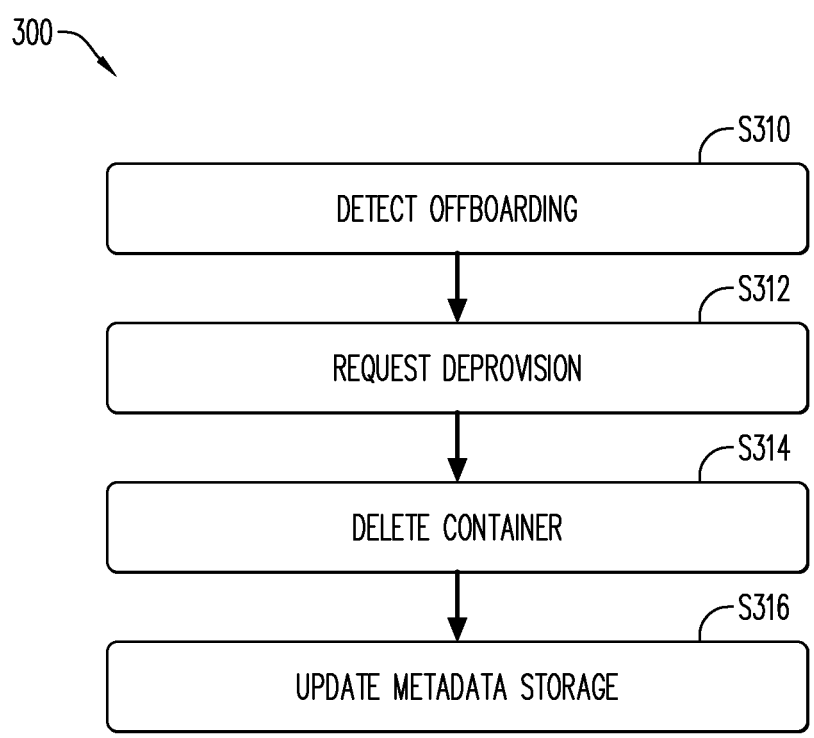
FIG. 3 illustrates a method to deprovision a physical data store instance according to some embodiments.

Embodiments may provide a large shared multi-tenant version of a Redis instance that maintains security of the different tenants sharing the instance. FIGS. 2 and 3 illustrates a method to provision or deprovision a logical Redis instance, respectively, according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein. As another example, the Shared Cluster Platform 104 may be conditioned to perform the process 200/300, such that a processor 610 (FIG. 6) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the process 200, the Orchestrator 112 requests one or more physical data store instances 108 from the Redis provider 118. The physical data store instance 108 may be assigned in response to the Orchestrator's request, with the Orchestrator 114 receiving an endpoint address 124 (host name/IP address) to access the physical data store instance 124. The endpoint address 124 for one or more physical data store instances 108, which together form a pool of the physical instances may be stored in a metadata storage ("pool") 126 of the Shared Cluster platform 104. In some embodiments, these physical data store instances 108 may be created prior to a request by a service consumer's application ("application") 102, while in other embodiments, a first physical data store instance 108 may be created when an application requests the instance. The number of physical data store instances 108 created in the pool 126 may be based on a particular application's 102 requirements. The Orchestrator 114 may store configuration rule data 128 indicating a maximum number of logical data store instances 120 that may be created on a given physical data store instance 108. This maximum number may be referred to herein as "maxTenantsAllowed" 130.

Initially, at S210, an application 102 sends a request 132 to the Service Broker 110 to provision a new instance for a tenant 504 (FIG. 5) being on-boarded. The tenant 504 may be one physical customer or end-user of the consumer application. As used herein, "on-boarding" may refer to the process of adding a new tenant to the system such that they may access their stored data via the requesting application. It is noted that in some instances, the customer may not directly access the data but may invoke some function in the consuming application which in turn reads/writes data on behalf of the tenant to execute the requested function. After the on-boarding process is complete, the tenant will be able to access (read and write) to the instance.

Then in S212, a physical data store instance 124 is selected. Upon receiving the request, the Service Broker 110 sends a request to the Orchestrator 114 to select a physical data store instance 108 from the pool 126. The Orchestrator 114 may select the physical data store instance 108 based on one or more configuration rules 128 stored at the Orchestrator 114 and data stored at the Metadata Storage 112 of the number of tenants using a given physical data store instance. The configuration rules 128 may be based on consumption, or consuming application specific configuration such as the aforementioned "maxTenantsAllowed." In one or more embodiments, the configuration rules 128 may be set by an application 102 or any other suitable party. As a non-exhaustive example, the configuration rules 128 may have the Orchestrator 114 select a physical data store instance 108 which is consumed the most, i.e., the one where the current number of logical data store instances 120 is closest to the "maxTenantsAllowed" 130 to optimize the instance usage. The Orchestrator 114 applies this configuration rule 128 to the data stored at the Metadata Storage 112 to select the physical data store instance 108. The data stored at the Metadata Storage indicates the current number of logical data store instances on the given physical data store instance. For example, if the rule is a maximum of ten tenants, and a given physical data store instance has ten tenants mapped thereto, the Orchestrator 114 will select another physical data store instance for the next tenant that makes a request.

After the Orchestrator 114 selects the physical data store instance 108, the Orchestrator 114 transmits this selection to the Service Broker 110 in S214. The Service Broker 114 then creates a logical data store instance 120 on the physical data store instance 108 by requesting a corresponding container 138 from the container engine 116 for the tenant 504 in S216. The logical data store instance 120 is manifested as the container 138. The container engine 116 generates the container 138 in S217. The inventors note that the container engine 116 may spawn a container in a matter of seconds, making the provisioning of a container much faster than the provisioning of a physical data store instance. As described above, the logical data store instance 120 is a proxy instance for the physical data store instance 108 in that the service consumer application 102 will contact the logical data store instance instead of the physical data store instance for data operations. The logical data store instance 120 may then execute the data operations by contacting the physical data store instance 108. It is noted that the advantage of this additional "layer" of routing the request via the logical data store instance i.e., routing it via the container, is that the container provides the isolation part of the multi-tenancy. Each container has a unique password, unique key-prefix requirements for the request, which ensures tenant isolation. The container 138 may run an image of a protocol aware proxy server such as Envoy, Twemproxy, or any other suitable protocol aware proxy server/Redis-protocol aware proxy server. The image may identify the software processes that run in the software container. In the non-exhaustive example described herein, the image will identify the Envoy proxy. The protocol aware proxy container 138 may filter requests to the physical data store instance 108 by applying routing rules to ensure the tenant data is kept separate from other tenant data. The Service Broker 110 then stores a mapping of the logical data store instance 120/container 138 to the tenant 504.

Next the Service Broker 110 generates a unique key element 134 for the tenant 504 in S218. The unique key element 134 may be a string generated by any suitable random/unique string generator. As a non-exhaustive example, the Service Broker 110 may use a library function in any programming language to generate the string. The inventors note that it may be desirable for the unique key element to be randomly generated ("random string element") to enhance security and avoid others from easily guessing or inadvertently using the unique key element. The unique key element 134 may be used by the application 102 as a key prefix that is coupled to all data requests pertaining to a given tenant 504. The unique key element 134 may be generated for a tenant in a 1:1 relationship.

The Service Broker 110 in S220 generates a second string to be used by application 102 as an authorization password 136 when accessing the container 138. The authorization password 136 may also be a randomly generated string and may be generated in a same or different manner than the unique key element 134. The Service Broker 110 may transmit the unique key element 134 and authorization password 136 to the application 102 and the Container Engine 116. The application 102 may store a mapping between the tenant 504 and the generated unique key element 134 and the authorization password 136.

In one or more embodiments, the container 138 may use an instance proxy filter configuration 140 that maps the tenant 504 to the selected physical data store instance 108 with the generated unique key element 134 and authorization password 136. The instance proxy filter configuration 140 may also be configured with connection details of the selected physical data store instance 108. A non-exhaustive example of the instance proxy filter configuration 140 is as follows:

prefix routes:
  case_insensitive:false
  routes:
    prefix: "<generated_KeyPrefix>"
    cluster: physical_redis_cluster
    downstream_auth_password:
      inline_string: "<generated_auth_password>"

The above configuration 140 instructs the proxy in the container to forward all data requests with the specified key prefix (unique key element) and to use the specified auth password to the specified physical redis cluster. Any request coming with an incorrect key prefix and/or incorrect auth password will be rejected. This effectively forces the application 102 to use the key prefix (unique key element 134) and auth password 136 and blocks the access for any non-conforming request.

The use of the unique key element 134 and auth password 136 may make each tenant "feel" that they have their own dedicated instance, as each tenant has a different logical data store endpoint/container authorization password to access what is ultimately a shared physical data store instance. The use of the unique key element 134 and auth password 136 may prevent the data for different tenants from clashing and/or prevent tenants from accessing data that is not theirs. In other words, as the tenants are sharing a single physical data store instance 108, assigning a unique key element 134 and auth password 136 for each tenant may keep the data isolated. For example, both Tenant A and Tenant B may use a key field "Name," and both tenants may want to enter values for the "Name" field (e.g., for Tenant A, "Name"=Bond; and for Tenant B "Name"=Smith). However, without the use of the unique key element and auth password, Tenant B's values may override Tenant A's values because they are using the same fields in the shared physical data store instance. This overriding may be referred to as "clashing of data". Embodiments assign the unique key element 134 to the tenant for the tenant to use on all data requests to keep the data for a given tenant isolated from the data for another tenant. The unique key element 134 may be used as a prefix on the data requests. Continuing with the above examples, Tenant A is assigned a unique key element 134 of ABC, (prefix: "generated_KeyPrefix"=ABC), and the cluster identifies the address to which the data is forwarded. All of Tenant A's operations may use this prefix—ABC. To that end, the key value for the Name key stored for Tenant A is ABC_Name=Bond. The container 138 may enforce the key value 134 as the container 138 knows the address of the party making the request, and in a case a tenant does not use the assigned unique key element 134 in the data operation, the operation is rejected.

Turning back to the process 200, in S222 the Service Broker 110 transmits a container connection endpoint 142 (i.e., hostname/IP address) of the container 138 to the application 102 as an endpoint of the logical data storage instance 120 for that given tenant 504. The container connection endpoint 142 is a proxy for the endpoint of the selected physical data store instance. It is noted in one or more embodiments, the application 102 does not know the coordinates (hostname/IP address) of the physical data store instance 108, just the container connection endpoint 142. It is noted that the application 102 also does not know the password of the physical data store instance; and that instead the application 102 is aware of the container's coordinates and password. The transmission of the container connection endpoint 142 may fulfill the onboard request 132. The application 102 then stores a mapping between the tenant 504 (including the assigned key element 134 and authorization password 136) and the generated container connection endpoint 142 in S224. Because the container 138 running the image of the proxy server is aware of the physical data store instance 108 protocol, the application 102 may continue to use any standard data store instance client library, while connecting to this container 138 running the image of the proxy server.

In one or more embodiments, the Service Broker 110 may also store the mapping between the provisioned logical data store instance 120, the physical data store instance 108 it is mapped to and information about the container connection endpoint spawned for this logical data store instance 120, as shown in the table 700 in FIG. 7.

This process 200 may be repeated to provision additional containers 138 to tenants 504, where the additional containers 138 are mapped to a same physical data store instance 108, or a different physical data store instance, based on the configuration rules 128.

In one or more embodiments, while process 200 is executing, the Orchestrator 114 may, in the background, monitor the mappings of tenants 504 to the physical data store instances 108 (i.e., monitor when logical data store instances are created to assess the consumption/occupancy levels of the physical data store instances in the pool). Consider the case the Orchestrator 114 determines that the occupancy level of the physical data store instances is greater than a pre-set threshold value 122. The Orchestrator 114 may then one of: 1. obtain more instances by provisioning additional physical data store instances 108 the Redis provider 118 or 2. adhere to the pre-set threshold and remove one or more physical data store instances by deprovisioning physical data store instances 108 back to the Redis provider 118. The Orchestrator 114 updates the Metadata Storage 112 accordingly, based on the provisioning/deprovisioning. This monitoring may ensure the pool of physical data store instances is maintained at optimum levels to serve future needs. As a non-exhaustive example, if the threshold value 122 is 85%, such that when a number of logical data store instances is greater or equal to 85% of the maxTenantsAllowed 130, the Orchestrator 114 will provision another physical data store instance.

Turning to FIG. 3, a method 300 to deprovision the logical data store instance is provided.

Initially, at S310, the application 102 detects that a tenant 504 has offboarded. This detection may vary from application to application. As a non-exhaustive example, the offboarding may be detection by the application in a case the customer/end-user unsubscribes from the application and/or deletes their account. Then, at S312, the application 102 transmits a request 132 to the Service Broker 110 to deprovision a logical data store instance 120. In response to receiving the request, the Service Broker 110 deletes the container 138 corresponding to the logical data store instance being deleted in S314. This deletion effectively cuts-off the application 102 from the backing physical data store instance 108. Next, in S316, the metadata storage 112 is updated to reflect this deletion.

As with process 200, while process 300 is executing, the Orchestrator may, in the background, monitor the mappings of tenants to the physical data store instances 108 and may decide to delete/deprovision one or more physical data store instances to ensure that the pool of physical data store instances is maintained at optimum level to serve future needs.

Figure 4:
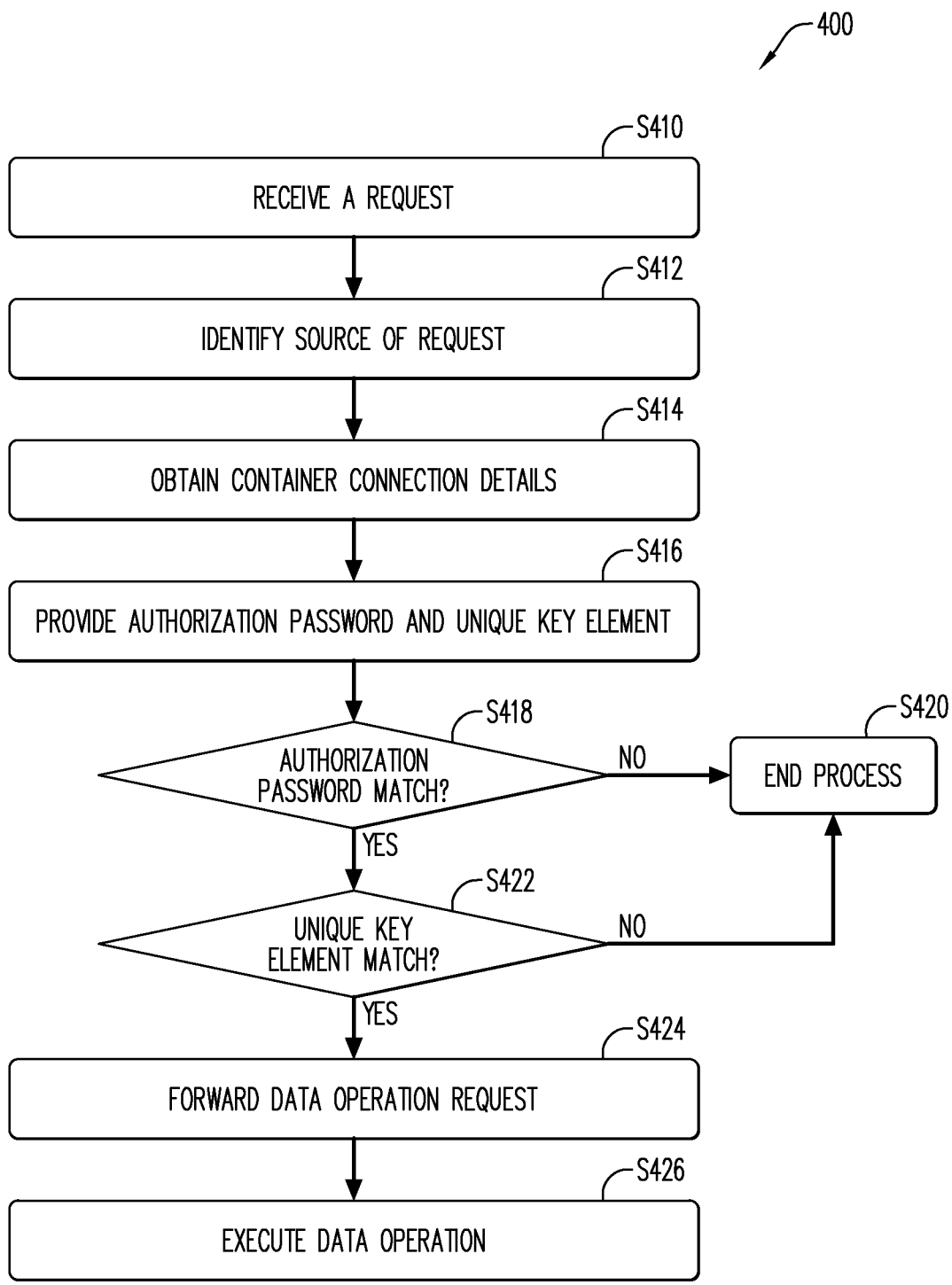
FIG. 4 illustrates a method to request data from a local data store instance according to some embodiments.
Figure 5:
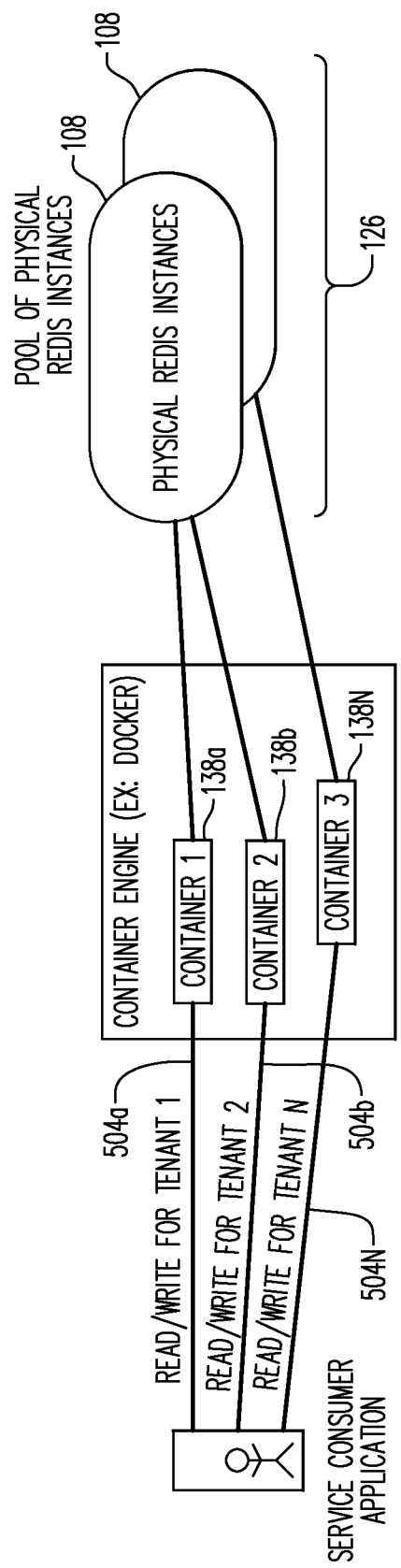
FIG. 5 is a block diagram of the method described with respect to FIG. 4.

Turning to FIGS. 4 and 5, a method 400 of how the application 102 accesses the physical data store instance 108 is provided.

Initially, at S410 the application 102 receives a request 506 for a data operation (i.e., a read/write/delete/update operation). The application 102 identifies the request as belonging to a given tenant 504a in S412. This identification may vary from application to application. As a non-exhaustive example, the identification may be based on information in the session, such as who is logged-in to the session. As shown in FIG. 5, multiple tenants (504a, 504b and 504n) may each be mapped to a respective container 138a, 138b and 138n, and all of these containers 138a, 138b, 138c are all mapped to a same physical data store instance 108. Then in S414, the application 102 obtains the container 138 connection details (connection endpoint, authorization password, unique key element) corresponding to this tenant, which it has previously obtained and stored as a table 700 in FIG. 7.

Next, in S416, the application 102 provides the auth password 136 and unique key element 134 to the container 138. It is noted that while both the auth password 136 and unique key element 134 are described in the S416 as being provided at a same, or substantially same, time, in other embodiments, they may be provided sequentially, with the auth password being provided first, and if approved, the key element is then provided. It is determined in S418, by the container 138, whether the auth password 136 received from the consuming application matches the auth password stored for the tenant in the table 800 (FIG. 8).

In an instance the container 138 determined at S418 the auth password 136 received from the application 102 does not match the stored auth password 836, the request for the data operation is denied and the process 400 ends at S420.

In a case the container 138 determines at S418 the auth password 136 received from the application 102 does match the stored auth password 836, the process 400 continues to S422 and the container 138 determines whether the received unique key element 134 matches the stored unique key element 834 for that tenant.

In a case the container 138 determines at S422 the received unique key element 134 does not match the stored unique key element 834 for that tenant, the request for the data operation is denied, the process returns to S420 and ends.

In a case the container determines at S422 the received unique key element 134 does match the stored unique key element 834 for that tenant, in S424 the container 138 forwards the data operation request to the physical data store instance 108. The physical data store instance 108 then executes the data operation in S426. In the case of a write operation, execution of the data operation results in the received data being written to the physical data store instance. In the case of a read operation, execution of the data operation results in data being retrieved from the physical data store instance and returned to the application 102 via the container 138 and Service Broker 110.

As described herein, embodiments provide for multiple tenants to share a same large physical data store. The physical data store instance, however, may not restrict the tenants to certain amounts of storage. For example, if the physical data store instance is 6 GB, the Orchestrator may set a configuration rule such that there can be a maximum of 6 tenants on each instance, with the idea that each tenant would have roughly 1 GB of storage. The Shared Cluster Platform 104 cannot enforce this use of space between tenants as the physical data store instance does not monitor such information. As such, Tenant A may use more storage than its allocated 1 GB. To address this, one or more embodiments may include an expiration/eviction policy 144 as stored by the Orchestrator 114 as part of the configuration rules 128. The expiration/eviction policy 144 may be set such that after a given amount of time old data may be replaced by new data. The expiration/eviction policy 144 may also evict keys using a policy such as LRU (least recently used). For example, the expiration/eviction policy 144 may be set such that when a physical data store instance is full, the next write operation coming to the instance may result in the eviction of a key that is not frequently used. The incoming write operation may then use the space made available by the deleted/evicted key. The expiration/eviction policy 144 may ensure that no tenant experiences an "out of memory" error and seemingly gets unlimited memory. Additional expiration/eviction policies will be further described below with respect to FIGS. 9-11. It is noted that even though the evicted data may not be available from the physical data store instance, the evicted data may be persisted elsewhere in a more permanent data store such that the eviction may avoid permanent deletion of the data. While embodiments may provide the expiration/eviction policy, the level of tenant isolation provided by embodiments may be more suited for development and testing scenarios than productive ones as a tenant may be less willing to share the singe large instance with other tenants in a production environment due to hard data store requirements (i.e., the tenant requires a set amount of storage), as described further below. However, the level of tenant isolation provided by embodiments may also be suited to productive environments.

Figure 6:
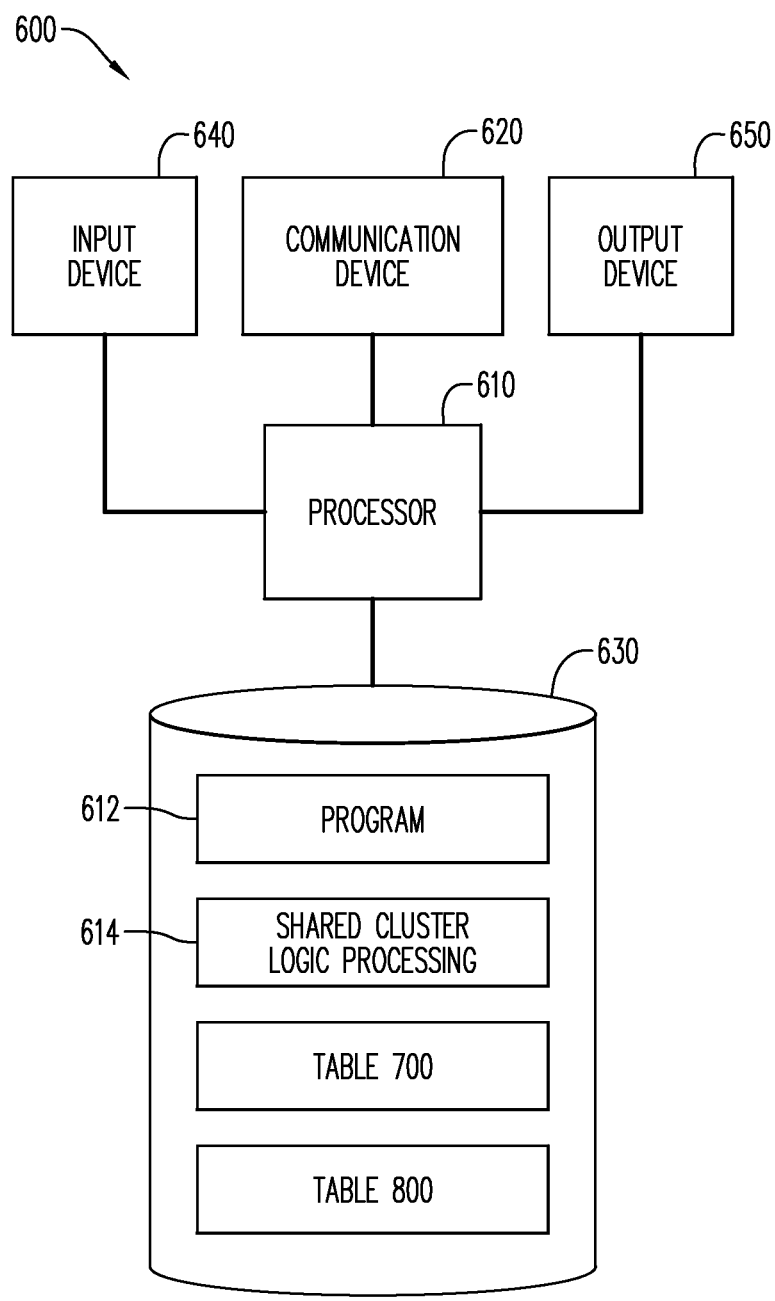
FIG. 6 is an apparatus or platform according to some embodiments.

Note that the embodiments described herein may be implemented using any number of different hardware configurations. For example, FIG. 6 is a block diagram of an apparatus or platform 600 that may be, for example, associated with the system 100 of FIG. 1 (and/or any other system described herein). The platform 600 comprises a processor 610, such as one or more commercially available CPUs in the form of one-chip microprocessors, coupled to a communication device 620 configured to communicate via a communication network (not shown in FIG. 6). The communication device 620 may be used to communicate, for example, with one or more remote user platforms, tenant data sources, etc. The platform 600 further includes an input device 640 (e.g., a computer mouse and/or keyboard to input information about optimization preferences) and an output device 650 (e.g., a computer monitor to render a display, transmit data etc.). According to some embodiments, a mobile device and/or PC may be used to exchange information with the platform 600.

The processor 610 also communicates with a storage device 630. The storage device 630 can be implemented as a single database or the different components of the storage device 630 can be distributed using multiple databases (that is, different deployment information storage options are possible). The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or shared cluster engine 614 for controlling the processor 610. The processor 610 performs instructions of the programs 612, 614, and thereby operates in accordance with any of the embodiments described herein. For example, the processor 610 may facilitate automated provisioning a given physical data store instance to multiple tenants.

The programs 612, 614 may be stored in a compressed, uncompiled and/or encrypted format. The programs 612, 614 may furthermore include other program elements, such as an operating system, clipboard application, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

In some embodiments (such as the one shown in FIG. 6), the storage device 630 further stores an application table data store 700 (FIG. 7) and a container map data store 800 (FIG. 8). An example of a database that may be used in connection with the platform 600 will now be described in detail with respect to FIGS. 7 and 8. Note that the databases described herein are only two examples, and additional and/or different information may be stored therein. Moreover, various databases might be split or combined in accordance with any of the embodiments described herein.

Referring to FIG. 7, a table is shown that represents the application connection detail table 700 that may be stored at the platform 600 according to some embodiments. The table may include, for example, entries identifying tenants provisioned to a physical data store instance. The table may also define fields 702, 704, 706, 708, 710 for each of the entries. The fields 702, 704, 706, 708, 710 may, according to some embodiments, specify: a logical data store instance 702, a container endpoint 704, a key element identifier 706, an authorization password identifier 708, and a physical data store instance 710. The application connection table data store 700 may be created and updated, for example, when a new tenant is provisioned/deprovisioned etc.

The key element 706 and authorization password 708 might be a unique alphanumeric label or link that is associated with a particular "tenant" in a multi-tenant shared cluster computing architecture that lets tenants share a same physical Redis instance. Each tenant's data may be isolated and remain invisible to other tenants. The logical instance identifier 702 might represent the logical instance created for that tenant. The container endpoint 704 may represent the endpoint coordinates for the container assigned to the tenant. The physical data store instance 710 may represent the physical data store instance shared by the tenant.

Referring to FIG. 8, a table is shown that represents the container tenant table 700 that may be stored at the platform 600 according to some embodiments. The table may include, for example, entries identifying tenants provisioned to a physical data store instance. The table may also define fields 834, 836, and physical data store instance 808 for each of the entries. The fields 834, 836 and 808 may, according to some embodiments, specify: a key element identifier 834, an authorization password identifier 836 and a physical data store instance 808. The container tenant table data store 800 may be created and updated, for example, when a new tenant is provisioned/deprovisioned etc.

The key element 834 and authorization password 836 might be a unique alphanumeric label or link that is associated with a particular "tenant" in a multi-tenant shared cluster computing architecture that lets tenants share a same physical Redis instance. Each tenant's data may be isolated and remain invisible to other tenants. The physical data store instance 808 may represent the physical data store instance shared by the tenant.

In this way, embodiments may facilitate the ability to use a physical Redis instance provided by PaaS vendors in a shared/multi-tenant fashion in an efficient and accurate manner. Embodiments may provide for the optimum usage of the PaaS vendor provided Redis service both capacity wise and cost wise by mapping each tenant to a logical Redis instance, rather than a physical Redis instance.

Embodiments may also improve the provision time of the data store instances, as well as provide a satisfactory level of "tenant isolation". Moreover, an increase of productivity, efficiency, and quality may be provided by the various embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 9:
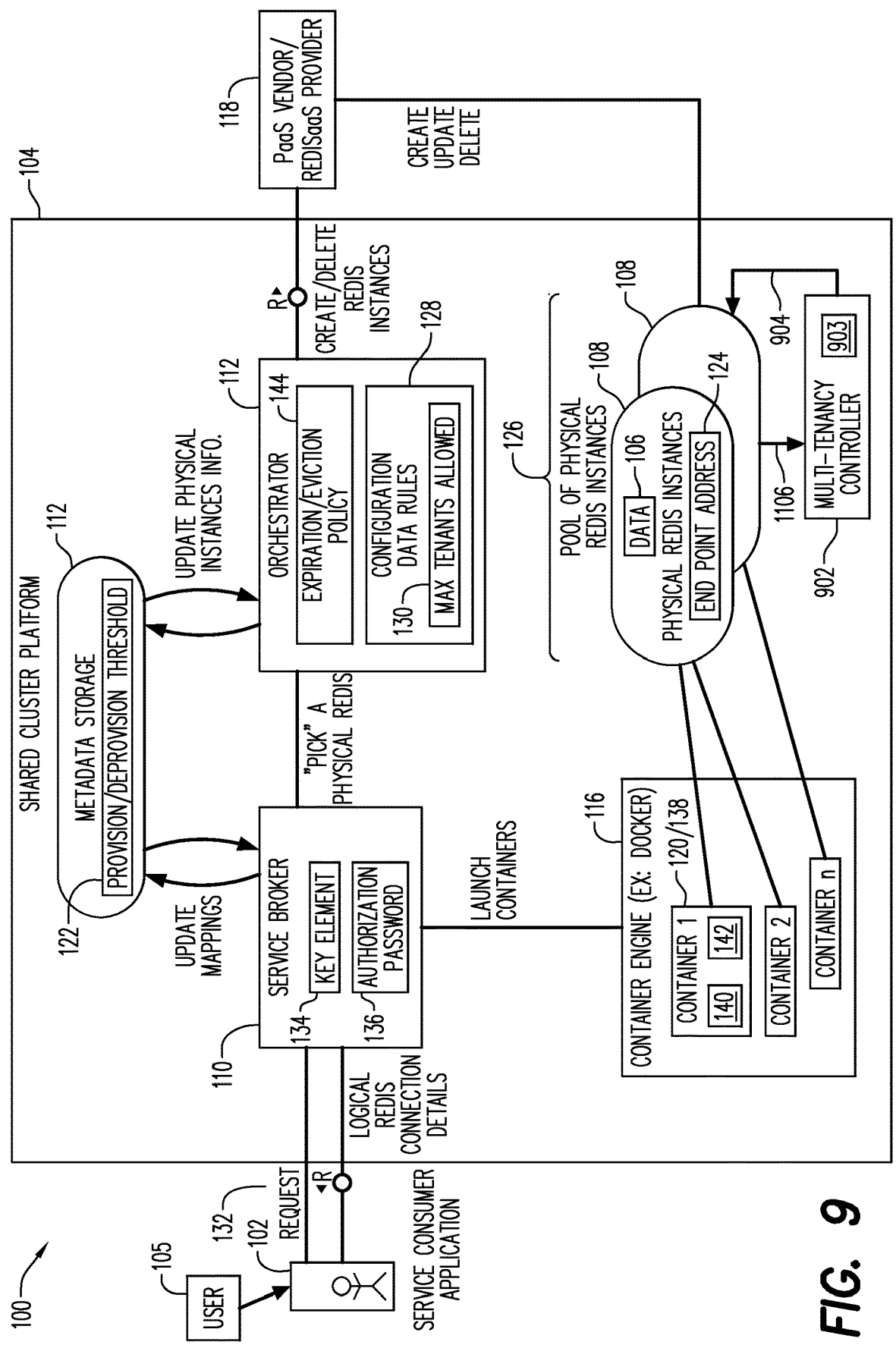
FIG. 9 illustrates a high-level block diagram of the system of FIG. 1 including a Multi-Tenancy Controller in accordance with some embodiments.

Referring to FIG. 9, the high-level block diagram of system architecture of FIG. 1 is provided as system 900, including a Multi-Tenant (MT) Controller 902.

As described above, in some embodiments the Shared Cluster Platform 104 cannot enforce the use of space between tenants as the physical data store instance does not monitor such information. This may create what may be referred to as a "noisy neighbor" problem. The noisy neighbor problem occurs when one tenant's performance is downgraded because of the activities of another tenant. In this case, a first consuming application using, for example, a first logical data store instance may consume a lot of the memory on the physical data store instance, not leaving a lot of memory for another application. While this problem may be addressed by the expiration/eviction polices 144 described above to the extent that memory will always be available for the applications, the tenant of the smaller application may observe its keys getting evicted in a pattern that does not match its access pattern because of the memory consumption of the larger first consuming application.

To address this, in some embodiments, the Shared Cluster Platform 104 may allot a set amount of Memory to each tenant and may provide a tenant-configurable expiration/eviction policy 144 managed by a Multi-Tenant ("MT") Controller 902. The use of the tenant-configurable expiration/eviction policy 144 may result in the key evictions representing the access pattern for the tenant. The MT Controller 902 is a software application responsible for applying expiration/eviction policies 144 (e.g., tenant-configurable) and controlling memory utilization to avoid the "noisy neighbor" problem. The MT Controller 902 may include a counter for each tenant to monitor the amount of memory storage used by that tenant's keys. In this way, the MT Controller 902 may restrict the memory used by each tenant.

Figure 10:
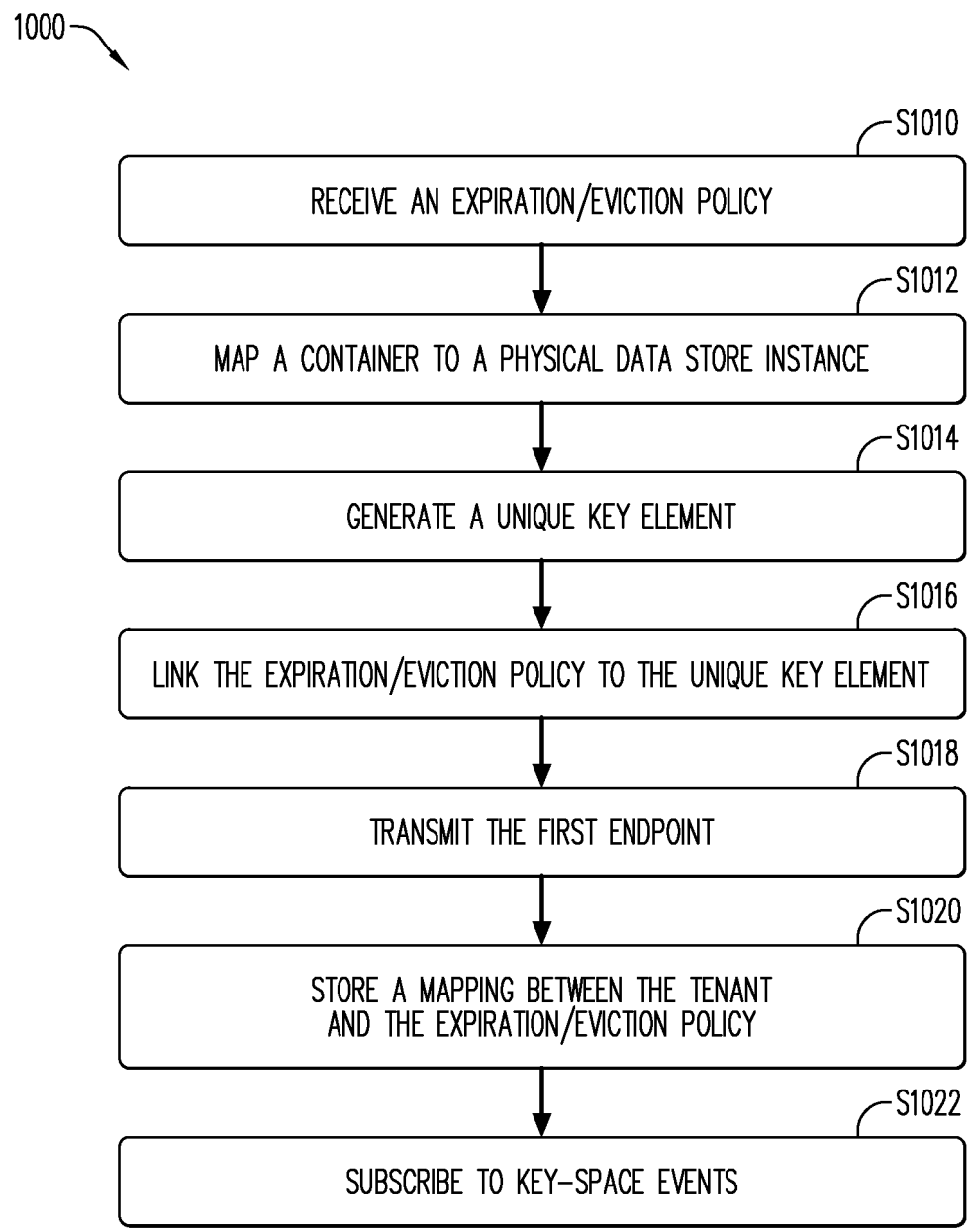
FIG. 10 illustrates a method to provision a physical data store instance including an expiration/eviction policy according to some embodiments.

Turning to FIG. 10 a method 1000 of provisioning a physical data store instance with an MT Controller is provided. While the method describes provisioning with respect to one tenant, the same process may be repeated for additional tenants, as described above.

Initially, at S1010, an expiration/eviction policy 144 for a first tenant is received by the shared cluster platform 104. In some embodiments, the expiration/eviction policy 144 may be received with the request 132 from the application 102 to the Service Broker 110 to provision a new instance for a tenant 504 (FIG. 5) being on-boarded. In other embodiments, the expiration/eviction policy 144 may be received at another time in the on-boarding process (e.g., when the Orchestrator 114 receives an endpoint address 124 to access the physical data store instance 108, or selects a physical data store instance from the pool 126, etc.). When the first tenant is on-boarded, they may receive an allotted value of memory storage on the physical redis instance. The allotted value may be determined by a service provider, for example. The allotment may be a fixed amount for each container that may be hardwired into the MT Controller (e.g., each container is allotted 5 MB), or based on a requested amount from the application during the on-boarding (e.g., tenant A requests 2 MB while tenant B requests 5 MB). In either instance, the MT Controller 902 receives an indication of the allotment.

The expiration/eviction policy 144 may be one of: 1. a number of keys policy, where whenever a tenant reaches its memory limit, the MT Controller 902 removes N number of random keys for this tenant (e.g., the MT Controller 902 may list all the tenant keys, and remove N number of keys randomly to make memory available for that tenant without affecting other tenants). As a non-exhaustive example, the MT Controller 902 may remove ten random keys for the tenant; 2. a memory consumption policy where whenever a tenant reaches its memory limit, the MT Controller 902 removes the top N most memory-consuming keys for this tenant (e.g., the MT Controller 902 may list all keys of the tenant, sort them by size, and remove the ten top memory consuming keys for the tenant); 3. an idle time policy where whenever a tenant reaches its memory limit, the MT Controller 902 removes keys which have been idle for X seconds; and 4. a hybrid memory-idle time policy where whenever a tenant reaches its memory limit, the MT Controller 902 removes the top N keys based on the combined value of memory and idle time of a key. 5. a prioritized policy where whenever a tenant reaches its memory limit, the MT Controller 902 removes N keys based on another prioritized order (e.g., evict X before Y; only evict X if XYZ, etc.) as set by the tenant. Other suitable expiration/eviction policies 144 may be used. In some embodiments, the expiration/eviction policy 144 (as a non-exhaustive example, the five policies presented above) may be presented to a user for selection thereof, while in other embodiments, the user may configure an expiration/eviction policy.

Then in S1012, a first container for the first tenant is mapped to a physical data store instance, as described above with respect to S217. Next, a unique first key element for the first tenant is generated in S1014, as described above with respect to S218. As described above, each tenant has a unique key element 134 generated for them, and the unique key element 134 may be used by the application 102 as a key prefix that is coupled to all data requests/operations pertaining to a given tenant 504, which ensures tenant isolation. The data stored in the containers may be stored as key-value pairs. For example, there may be a key called "favorite_color" and a value called "blue", continuing with the example provided above, Tenant A has a unique key element 134 of "ABC". As such, the key value for the "favorite color" key stored for Tenant A may be ABC_favorite_color". The memory used by a key includes memory of meta data as well as memory occupied by the value of the key.

The expiration/eviction policy 144 is linked to the unique first key element 134 for the first tenant in S1016. This linking may be stored (S1020, described below) as another field in application connection detail table 1300 (FIG. 13), which is the similar to application connection detail table 700 with the addition of an expiration/eviction policy field 1312.

Next in S1018, a first endpoint of the first container is transmitted as a proxy for the selected physical data store instance, as described above with respect to S222. The transmission of the container connection endpoint 142 may fulfill an onboard request 132. The application then stores a mapping between the tenant 504 (including the assigned key element 134 and authorization password 136) and the generated container connection endpoint 142, as described above in S224. The metadata storage 112 and/or orchestrator 112 may store a mapping between the tenant 504 (including the assigned key element 134) and the selected expiration/eviction policy 144 in S1020.

After the selected expiration/eviction policy 144 is mapped to the assigned key element 134 for the tenant 504, the MT Controller 902 subscribes to "Key-Space Events" 1102 on the physical redis instance 108 for the given container in S1022. A Key-Space Event is a change that occurs to the value stored at a particular key or keys. As a non-exhaustive example, whenever there is a set/get/read/write/expire/delete operation on the physical redis instance 108, a key-space event notification is published indicating the performance of the event, and the notification is sent to anything that has subscribed to the event. By subscribing to the Key-Space Events, the MT Controller 902 may receive a notification any time the application executes one of these operations with respect to the physical redis instance 108. In one or more embodiments, the unique key element 134 for a given tenant is appended to each key-space event 1102 for that tenant. It is noted that by using native redis constructs, such as Key-Space Events, and Lua commands, "MEMORY USAGE <KEY>" described below, performance bottlenecks may be minimized.

It is further noted that with Key-Space Events, not only can the MT Controller subscribe to the events, but a tenant may also subscribe to these events and see the keys of other tenants. To avoid this, and maintain isolation of the tenants from each other, embodiments may re-name the command related to subscriptions to the key-space events so that only the MT Controller may subscribe to the events. The re-naming may be to a random string that is known to the service provider. The random string may be generated via a generator similar that described above with respect to generation of the unique key element. The renaming may occur at provisioning of the physical redis instance 108. The physical redis instance 108 may have the re-named command stored thereon, and the MT Controller then may subscribe to events at the physical redis instance 108 using the re-named subscribe command. In this way, when consumer applications or other elements (e.g., anyone outside the service provider) try to subscribe to key-space events on the physical redis instance using a conventional subscribe command, they may receive an error and may be prevented from subscribing.

Figure 11:
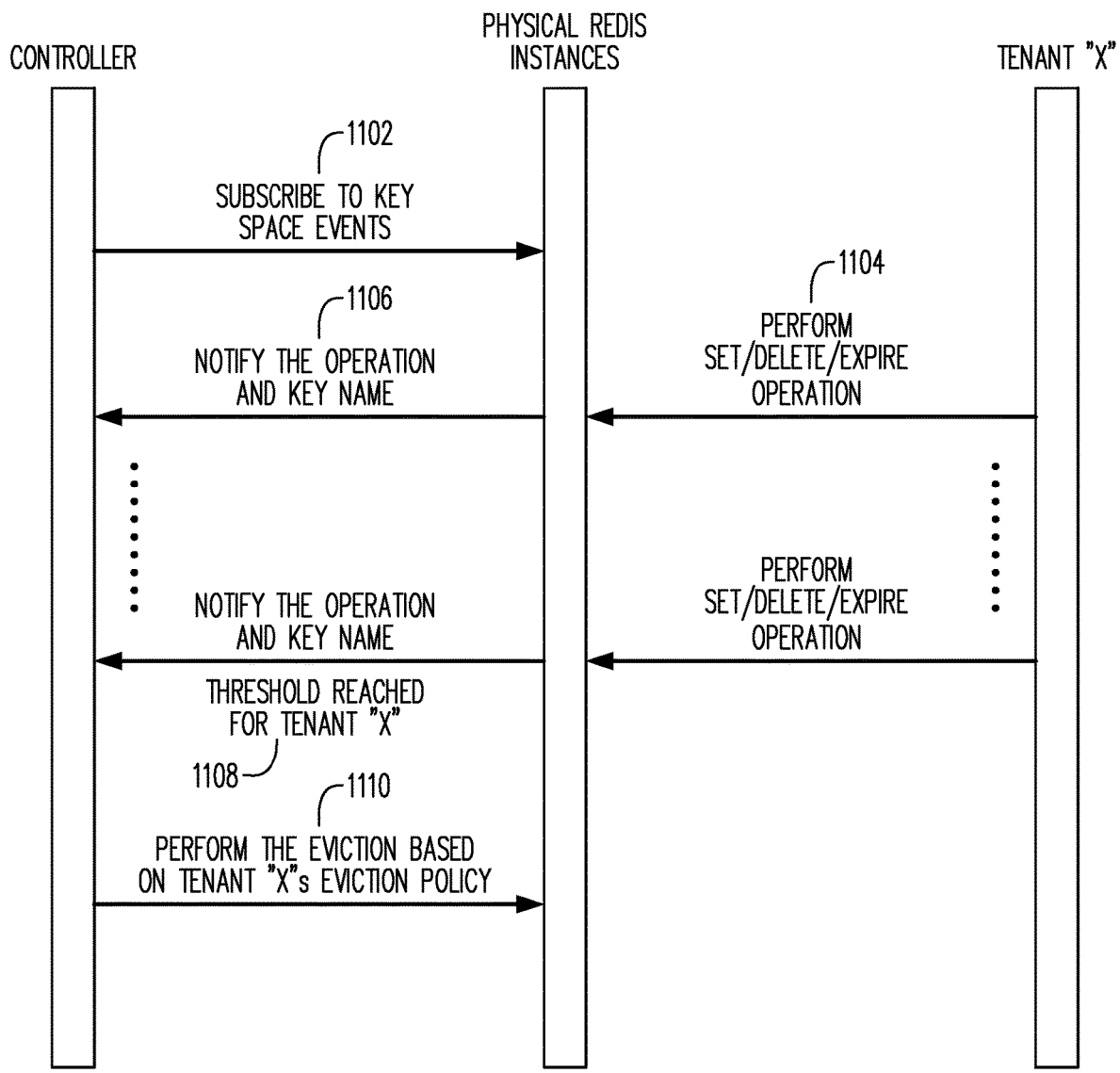
FIG. 11 illustrates a block diagram according to some embodiments.
Figure 12:
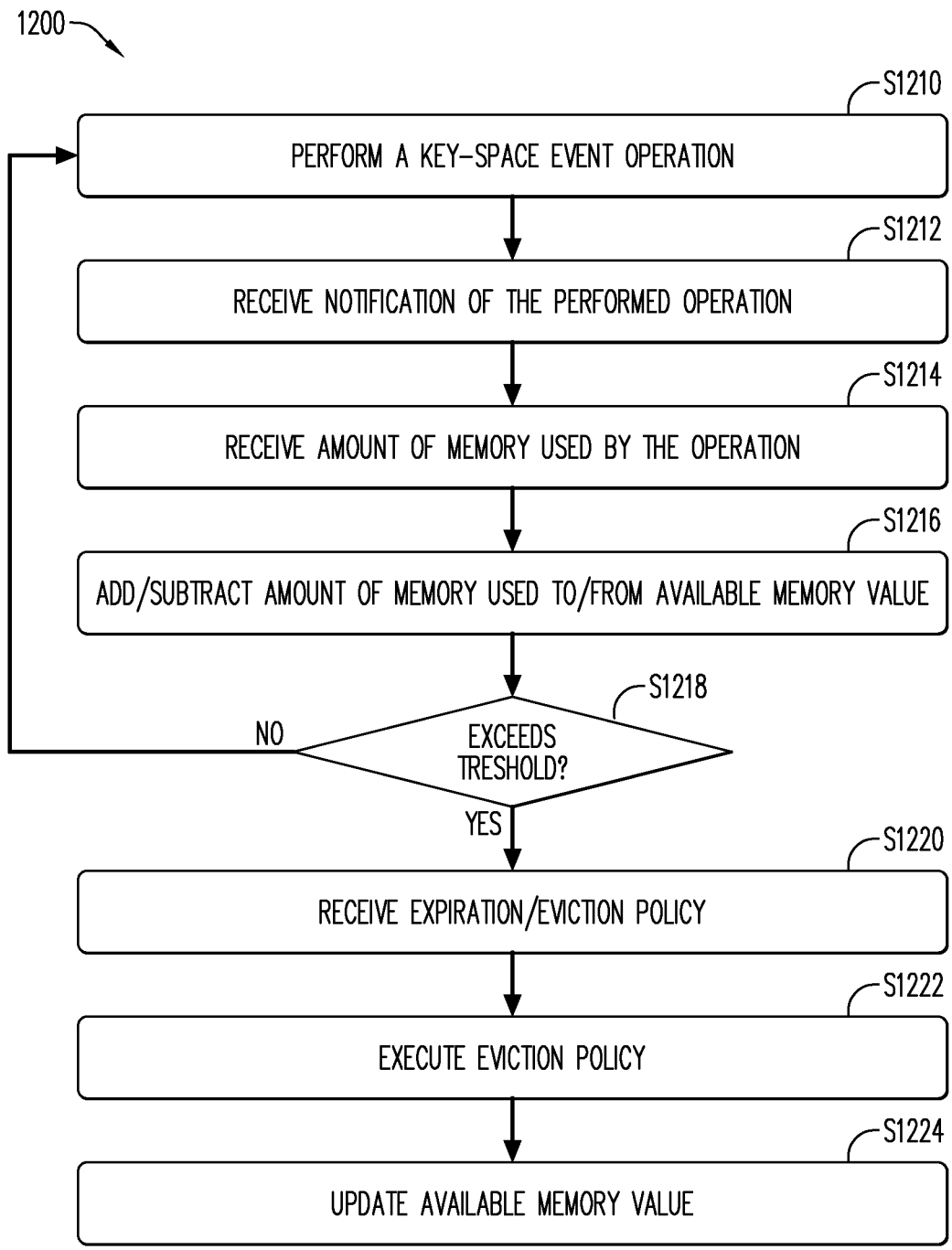
FIG. 12 illustrates a method to evict data according to some embodiments.

Turning to FIGS. 11-12, a method 1200 of monitoring the memory usage via the MT Controller and invocation of the expiration/eviction policy by the MT Controller is provided. Prior to S1202, the MT Controller 902 subscribes to Key-Space Events 1102 on the physical redis instance 108 for the given container, as described above in S1022.

In S1210, the application 102 for a given tenant 504 performs a key-space event operation 1104 that affects data stored on the physical redis instance 108. The MT Controller 902 receives, from the physical redis instance 108, notification of the event 1106, including the unique key element 134 tied to the operation, in S1212. As described above, the metadata storage 112 stores the mapping of the unique key element 134 to a particular container/logical redis instance, which in turn is mapped to a particular tenant and expiration/eviction policy. The metadata storage 112 may also store the allotted memory storage for a particular tenant. By the key-space event operation 1104, MT Controller 902 may receive in S1214 from the physical redis instance 108, the amount of memory consumed. The physical redis instance 108 may send the amount of memory used by the operation (and marked by the unique key element 134) to the MT Controller 902 in response to a request from the MT Controller (e.g., the use of "MEMORY USAGE <KEY>" command) or in response to another trigger. Then, in S1216, a counter 903 of the MT Controller 902 may add or subtract the received amount of memory from an available memory value for that tenant to generate an updated memory usage value. The counter 903 may be any suitable counter that tracks the amount of memory storage used by a tenant. In some embodiments, the MT Controller 902 may have a counter 903 for each tenant. The MT Controller 902 may keep a running account of the amount of memory consumed by each tenant by keeping a running tab of the key usage. The MT Controller 902 may then determine in S1218 whether the memory used by the tenant exceeds a threshold value based on a comparison of the updated memory usage value to the threshold value. The threshold value may be set to be equal to or less than the allotted memory storage.

In an instance the updated memory usage value does not exceed the threshold value in S1218, the process 1200 returns to S1210.

In a case the updated memory usage value exceeds the threshold value (1108) in S1218, the process 1200 proceeds to S1220. In S1220, the MT Controller 902 receives the expiration/eviction policy 144 for that tenant from the metadata storage 112. Then in S1222 the MT Controller 902 executes the received expiration/eviction policy 144 by instructing 904 (FIG. 9) the physical redis instance 108 to evict particular keys (1110) as per the policy. The expiration/eviction policy 144 includes instructions to delete at least one key-value pair for the given tenant in accordance with the policy (e.g., a number of key policy, a memory consumption policy, an idle time policy, and a hybrid memory-idle time policy). In one or more embodiments, the eviction may be via Lua script on the physical redis instance 108. A Lua script is a native redis construct. The use of a Lua script may reduce the performance impact of the eviction process as it allows for the deletion of multiple keys with a single command. After deletion, the counter 903 may adjust the available memory value for the tenant to generate an updated available memory value in S1224.

Although specific hardware and data configurations have been described herein, note that any number of other configurations may be provided in accordance with some embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system associated with a multi-tenant data store, comprising:
   at least one physical data store instance adapted to contain electronic records; and
   a shared cluster platform, coupled to the data store, including:
   a computer processor, and
   a computer memory, coupled to the computer processor, storing instructions that, when executed by the computer processor cause the shared cluster platform to:
   receive an eviction policy for a first tenant for a data store;
   map a first container for the first tenant to a physical data store instance;
   generate a unique first key element for the first tenant, wherein the eviction policy for the first tenant is linked to the unique first key element; and
   transmit a first endpoint of the first container as a proxy for the selected physical data store instance.

2. The system of claim 1, wherein the unique first key element for the first tenant is appended to each key event for the first tenant.

3. The system of claim 2, wherein the key event is an event that affects data stored in the first container of the first tenant.

4. The system of claim 3, wherein the data stored in the first container of the first tenant is stored as key-value pairs.

5. The system of claim 4, wherein the key event is one of a set, get, read, write, expire, delete and increment event.

6. The system of claim 3, further comprising instructions to:
receive notification of execution of the key event.

7. The system of claim 6, further comprising instructions to:
maintain a counter for the first tenant;
add or subtract, via the counter, memory used by the first tenant in response to the received notification of the event;
determine, based on the addition or subtraction, whether the memory used by the first tenant exceeds a threshold; and
in a case the memory used by the first tenant exceeds a threshold, execute an eviction policy.

8. The system of claim 7, wherein the eviction policy includes instructions to delete at least one key-value pair of the first tenant.

9. The system of claim 8, wherein the instructions to delete at least one key-value pair of the first tenant is based on at least one of: on a number of key policy, a memory consumption policy, an idle time policy, a hybrid memory-idle time policy, and a prioritized policy.

10. The system of claim 6, further comprising instructions that, prior to receipt of notification of execution of the key event:
re-name a subscribe command with a random string; and
subscribe to key-space events on the physical data store instance via the re-named subscribe command.

11. The system of claim 1, wherein the first tenant has a pre-set allotment of memory of the physical data store instance.

12. The system of claim 1, further comprising instructions to:
receive an eviction policy for a second tenant;
map a second container for the second tenant to the physical data store instance mapped to the first container for the first tenant;
generate a unique second key element for the second tenant; and
transmit a second endpoint of the second container as a proxy of the selected physical data store instance.

13. The system of claim 12, wherein eviction per the eviction policy for the second tenant is restricted to data associated with the unique second key element for the second tenant.

14. A computer-implemented method associated with a multi-tenant data store, comprising:
receiving an eviction policy for a first tenant for a data store;
mapping a first container for the first tenant to a physical data store instance, wherein the first tenant has a pre-set allotment of memory of the physical data store instance;
generating a unique first key element for the first tenant, wherein the eviction policy for the first tenant is linked to the unique first key element; and
transmitting a first endpoint of the first container as a proxy for the selected physical data store instance.

15. The computer-implemented method of claim 14, further comprising:
re-naming a subscribe command with a random string;
subscribing to key-space events on the physical data store instance via the re-named subscribe command;
receiving notification of execution of a key event that affects data stored in the first container of the first tenant;
maintaining a counter for the first tenant;
adding or subtracting, via the counter, memory used by the first tenant in response to the received notification of the event;
determining, based on the addition or subtraction, whether the memory used by the first tenant exceeds a threshold; and
in a case the memory used by the first tenant exceeds a threshold, executing an eviction policy.

16. The computer-implemented method of claim 15, wherein execution of the eviction policy further comprises:
deleting data from the first container of the physical data store instance.

17. The computer-implemented method of claim 16, wherein the data is deleted based on one of: a number of keys policy, a memory consumption policy, an idle time policy, a hybrid memory-idle time policy, and a prioritized policy.

18. The computer-implemented method of claim 15, wherein eviction per the eviction policy is restricted to data associated with the unique first key element for the first tenant.

19. A non-transitory, computer readable medium having executable instructions stored therein to perform a method associated with a multi-tenant data store, the method comprising:
receiving an eviction policy for a first tenant for a data store;
mapping a first container for the first tenant to a physical data store instance;
generating a unique first key element for the first tenant, wherein the eviction policy for the first tenant is linked to the unique first key element; and
transmitting a first endpoint of the first container as a proxy for the selected physical data store instance.

20. The medium of claim 19, further comprising:
re-naming a subscribe command with a random string;
subscribing to key-space events on the physical data store instance via the re-named subscribe command;
receiving notification of execution of a key event that affects data stored in the first container of the first tenant;
maintaining a counter for the first tenant;
adding or subtracting, via the counter, memory used by the first tenant in response to the received notification of the event;
determining, based on the addition or subtraction, whether the memory used by the first tenant exceeds a threshold; and
in a case the memory used by the first tenant exceeds a threshold, executing an eviction policy.

* * * * *